(12) United States Patent
Hattori et al.

(10) Patent No.: US 6,742,496 B2
(45) Date of Patent: Jun. 1, 2004

(54) BUTTERFLY VALVE

(75) Inventors: Satoshi Hattori, Obu (JP); Kazuhisa Nomura, Obu (JP)

(73) Assignee: Aisan Kogyo Kabushiki Kaisha, Aichi (JP)

( * ) Notice: Subject to any disclaimer, the term of this patent is extended or adjusted under 35 U.S.C. 154(b) by 60 days.

(21) Appl. No.: 10/301,602

(22) Filed: Nov. 22, 2002

(65) Prior Publication Data
US 2003/0101966 A1 Jun. 5, 2003

(30) Foreign Application Priority Data
Dec. 4, 2001 (JP) .......................... 2001-402406

(51) Int. Cl.⁷ .................. F02D 9/10; F16K 1/226; F16J 15/54
(52) U.S. Cl. .................. 123/337; 123/399; 251/305; 277/350
(58) Field of Search .................. 123/337, 339; 277/345–352; 251/305, 306, 357

(56) References Cited

U.S. PATENT DOCUMENTS
6,565,067 B1 * 5/2003 Nanba et al. .............. 251/305

FOREIGN PATENT DOCUMENTS
JP   55-161259 A1   12/1980
JP   61-048923 A1   4/1986
JP   06-039052 A1   10/1994

* cited by examiner

Primary Examiner—Mahmoud Gimie
Assistant Examiner—Arnold Castro
(74) Attorney, Agent, or Firm—Rader, Fishman & Grauer PLLC

(57) ABSTRACT

The butterfly valve of the invention is provided with a valve shaft to which a valve body is mounted, and a pair of slide bearings which rotatably support both ends of the valve shaft. Inner peripheral surfaces of the slide bearings being in contact with the valve shaft are formed in a convex curved surface protruding to an inner peripheral side, and the inner peripheral surfaces of the slide bearings are formed in a circular arc shape in cross section along an axial direction. The inner peripheral surfaces in the slide bearings in both sides being in contact with the valve shaft are formed in a convex curved shape protruding to the inner peripheral side, and the inner peripheral surfaces of the slide bearings are formed in a circular arc shape in cross section along the axial direction. Accordingly, the inner peripheral surfaces of the bearings are in contact with the outer peripheral surface of the valve shaft in a substantially line contact manner. Therefore, even in the case that the valve holder to which both of the slide bearings are mounted are deformed at a time of being manufactured and a displacement is generated at an axial position of the slide bearings at both ends, it is possible to well fit the valve shaft to both of the slide bearings because the bearings in both ends serve to absorb the displacement in the axis.

4 Claims, 8 Drawing Sheets

BUTTERFLY VALVE

BACKGROUND OF THE INVENTION

1. Field of the Invention

The present invention relates to a butterfly valve which is used in an intake control valve of an internal combustion engine or the like, and more particularly to a butterfly valve in which a bearing portion rotatably supporting a valve shaft pivoting a butterfly-shaped valve body is improved.

2. Description of Related Art

Conventionally, for example, in a multi-cylinder internal combustion engine, there has been known a butterfly-shaped intake control valve in which a first surge tank chamber and a second surge tank chamber are communicated by forming a partition wall in an inner portion of a surge tank of the internal combustion engine, forming the first surge tank chamber and the second surge tank chamber within the surge tank, arranging an intake control valve in a communication hole formed on the partition wall, fully closing the intake control valve so as to separate the first surge tank chamber from the second surge tank chamber, and fully opening the intake control valve so as to communicate the first surge tank chamber with the second surge tank chamber (for example, refer to Japanese Utility Model Publication No. 6-39052 and the like).

The intake control valve controls so as to fully open or fully close the valve in response to a high load low speed operation or a low load high speed operation of the internal combustion engine, thereby changing an equivalent pipe length of an intake passage, and is controlled in such a manner as to secure a high charging efficiency all around the speed range of the internal combustion engine by using an intake inertia effect. Further, in the intake control valve, the intake inertia effect is weakened if an air leak is generated at a time when the intake control valve is fully closed, so that it is impossible to sufficiently increase the charging effect. Accordingly, a high sealing property is required at the fully closing time.

This kind of intake control valve is attached to an opening portion provided in the partition wall of the surge tank, a large valve hole is provided in a plate-like valve holder attached to the opening portion thereof so as to secure a sufficient air flow rate, and the butterfly valve is supported to the valve hole via a valve shaft so as to freely open and close. Since the valve hole is formed large in a large opening state, there is considered a structure having an elongated valve hole as shown in FIG. 10.

In the elongated large intake control valve mentioned above, a valve holder 50 thereof has a large valve hole formed in an inner side thereof, and is formed thin so as to correspond to a thin partition wall of the surge tank. Further, a large valve body is pivoted to a valve hole provided within the valve holder 50 via an elongated valve shaft 54, and slide bearings 51 and 52 receiving the valve shaft 54 are provided in both ends of the valve holder 50.

Accordingly, even if the slide bearings 51 and 52 fixed to both ends of the valve holder 50 are arranged on the same axis on design, a displacement is easily generated at a position of the axis of the slide bearings 51 and 52 at both ends due to a deformation of the valve holder 50 at a time of manufacturing or the like. In the case that the axial position of the slide bearings 51 and 52 at both ends is largely displaced, it is impossible to fit the valve shaft 54 to both of the slide bearings 51 and 52. Thus, it is necessary to provide a certain level of gap for fitting the valve shaft 54 to both of the slide bearings 51 and 52, and there is a risk that an airtightness at the fully closing time is deteriorated due to the gap generated between the valve shaft 54 and both of the slide bearings 51 and 52, and an air leak is generated at a time of fully closing the butterfly valve. Further, if the large gap exists in the fitting between the valve shaft 54 and both of the slide bearings 51 and 52, a play is generated in a motion of the valve body of the butterfly valve, and there is a risk that a problem is generated in an opening and closing operation of the valve.

Then, it is considered to arrange a self-aligning bearing as described in Japanese Unexamined Patent Publication No. 55-161259 in the bearing of the butterfly valve 53 mounted to the valve holder 50. However, since this kind of self-aligning slide bearing is formed so that an outer peripheral surface thereof has a spherical surface of a fixed diameter, it is necessary to mount a concave spherical supporting portion for movably holding the spherical surface in an outer side of the bearing, so that there are problems that the structure is complicated, a number of parts is increased, and a manufacturing cost is increased.

SUMMARY OF THE INVENTION

In accordance with the present invention, there is provided a butterfly valve comprising:

a pair of slide bearings arranged on the same axis in both sides with respect to a valve hole;

a valve shaft rotatably supported to the slide bearings; and a butterfly-shaped valve body fixed to the valve shaft and opening and closing the valve hole in correspondence to a rotation of the valve shaft, wherein an inner peripheral surface which is in contact with the valve shaft in the slide bearings in both sides is formed by a convex curved surface protruding to an inner peripheral side, and an inner peripheral surface shape of the slide bearing in a cross section along an axial direction is formed in a circular arc shape.

An object of the present invention is to provide a butterfly valve which has a simple structure, can be manufactured with a low cost, makes a gap between an inner peripheral surface of the slide bearing and an outer peripheral surface of the valve shaft minimum, absorbs a displacement of an axial position in the bearings in both sides, and can minimize a fluid leak at a time of being fully closed.

In accordance with the butterfly valve of the present invention, the structure is made such that the inner peripheral surface which is in contact with the valve shaft in the slide bearings in both sides is formed by the convex curved surface protruding to the inner peripheral side, and the inner peripheral surface shape of the slide bearing in the cross section along the axial direction is formed in the circular arc shape, whereby the inner peripheral surface of the bearing becomes in contact with the outer peripheral surface of the valve shaft in an substantially line contact manner. Accordingly, even in the case that the valve holder to which both of the slide bearings are mounted is deformed at a time of manufacturing, and the displacement is generated in the axial position of the slide bearings at both ends, the bearings at both ends move so as to absorb the displacement of the axis, so that it is possible to well fit the valve shaft to both of the slide bearings. Further, since the inner peripheral surface of the bearing is in contact with the outer peripheral surface of the valve shaft in the substantially line contact manner, the gap therebetween becomes minimum, so that it is possible to minimize the fluid leak at a time of being fully closed. Further, since the inner peripheral surface of the bearing is in contact with the outer peripheral surface of the valve shaft in the approximately line contact manner, it is possible to well absorb an incline or a displacement generated between the bearings in both sides due to a vibration, a heat deformation or the like at a time of using, both of the bearings serve a self-aligning operation, and it is possible to secure an improved opening and closing operation of the valve.

DESCRIPTION OF THE PREFERRED EMBODIMENTS

A description will be given below of the present invention on the basis of an embodiment shown in the accompanying drawings. In this case, the present invention is not limited to the embodiment. Every modification within the elements of claim or equivalents concerning the elements are included within the scope of claim.

Figure 1:
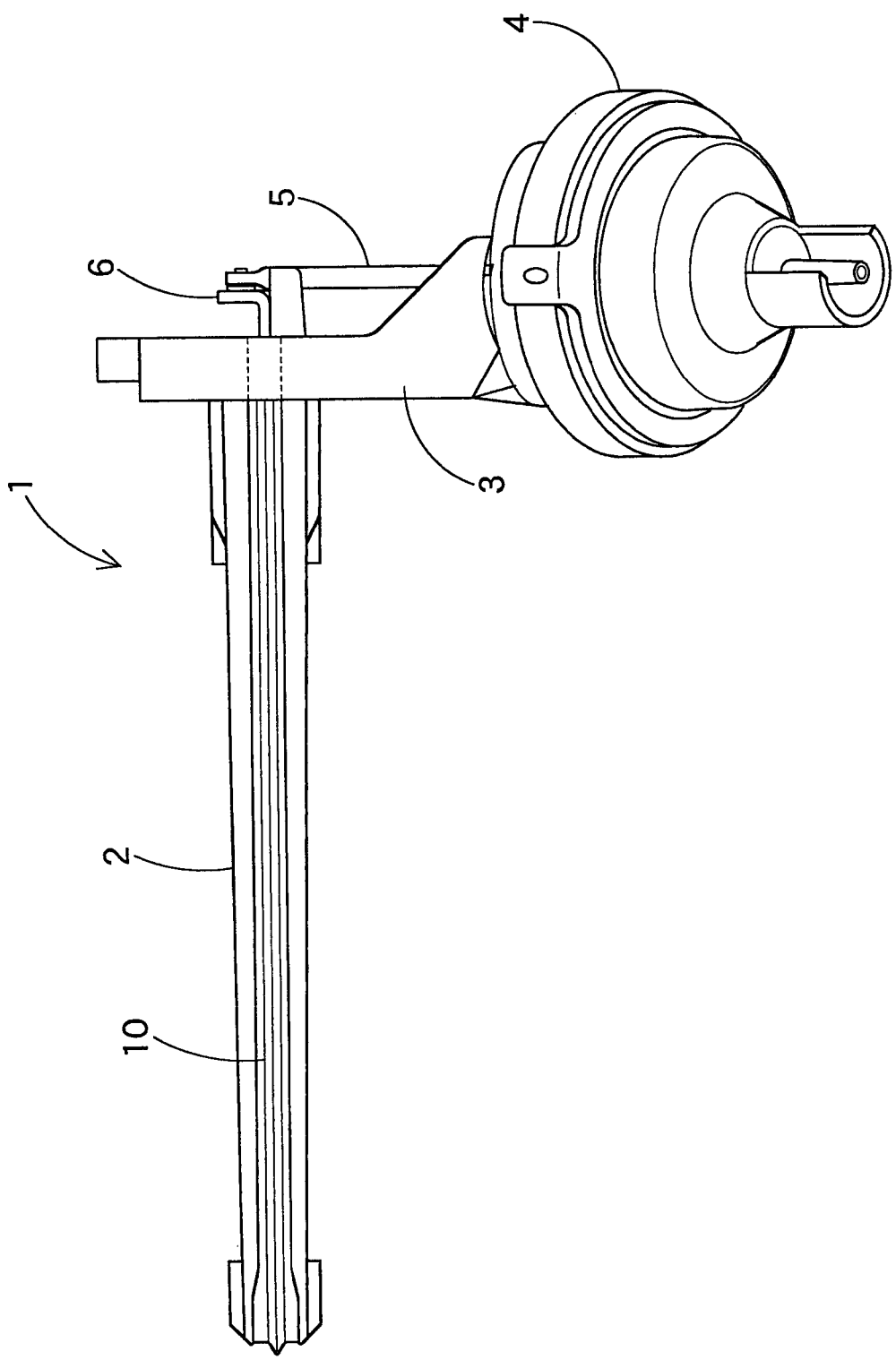
FIG. 1 is a front elevational view of an intake control valve to which a butterfly valve in accordance with the present invention is applied.
Figure 2:
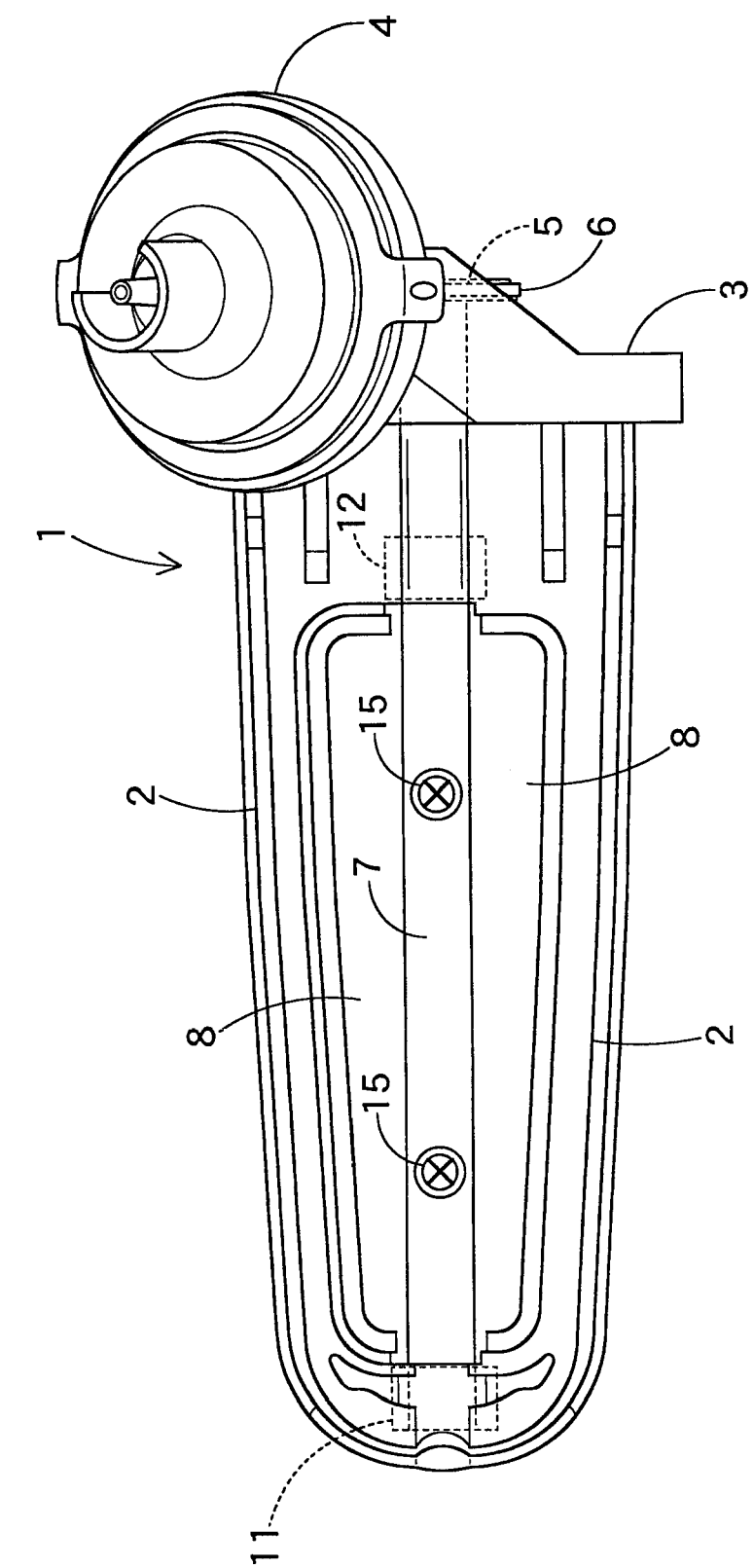
FIG. 2 is a plan view of the intake control valve.
Figure 3:
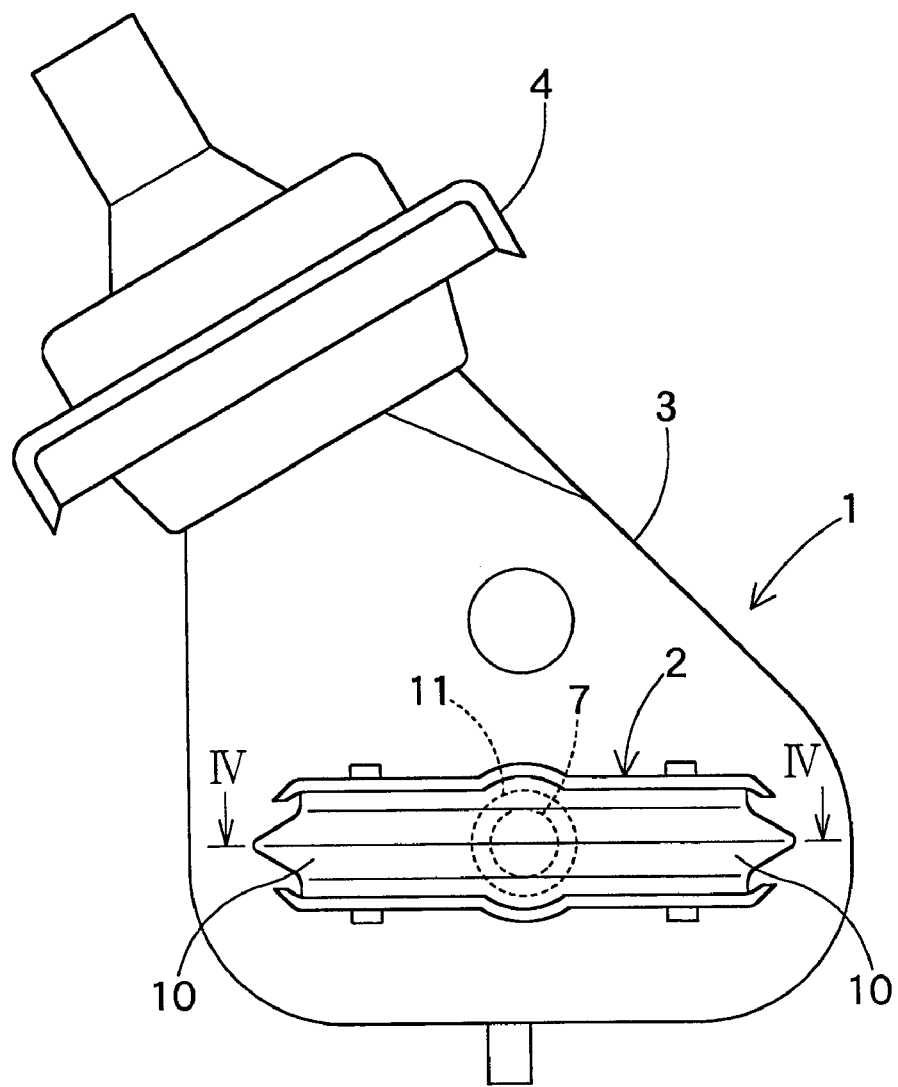
FIG. 3 is a left side elevational view of the intake control valve.

FIG. 1 shows a front elevational view of an intake control valve 1 to which a butterfly valve in accordance with the present invention is applied, FIG. 2 shows a plan view of the same, and FIG. 3 shows a left side elevational view of the same. The intake control valve 1 is constituted by a mounting portion 3 which is mounted so as to close an opening portion 29 of a surge tank 20 mentioned below, a valve holder 2 which is vertically protruded to a side portion from the mounting surface of the mounting portion 3, a diaphragm type actuator 4 which is fixed to an end portion of the mounting portion 3, and a butterfly-shaped valve body 8 which is pivoted via a valve shaft 7 so as to open and close a substantially trapezoidal valve hole 9 formed in an inner side of the valve holder 2.

As shown in FIG. 1, a low end of the valve shaft 7 pivoting the valve body 8 protrudes to an outer side of the mounting portion 3, a lever 6 is fixed to an end portion thereof, and a rod 5 mounted as an output shaft of the actuator 4 is connected to an end portion of the lever 6. Then, the rod 5 moves in an axial direction on the basis of an operation of the actuator 4 so as to rotate the lever 6 and rotate the valve shaft 7, thereby opening and closing the butterfly-shaped valve body 8. A rubber seal member is fitted to an outer peripheral portion of the valve body 8.

A substantially trapezoidal valve hole 9 is formed in an inner side of the valve holder 2, and a pair of slide bearings 11 and 12 are mounted to left and right end portions of the valve hole 9 so as to oppose to each other on the same axis. For example, in the case that the valve holder 2 is formed by a synthetic resin, it is possible to mount the slide bearings 11 and 12 to both sides with respect to the valve hole 9 on the same axis by press-fitting the slide bearings 11 and 12 to columnar holes formed at a time of molding.

Figure 6:
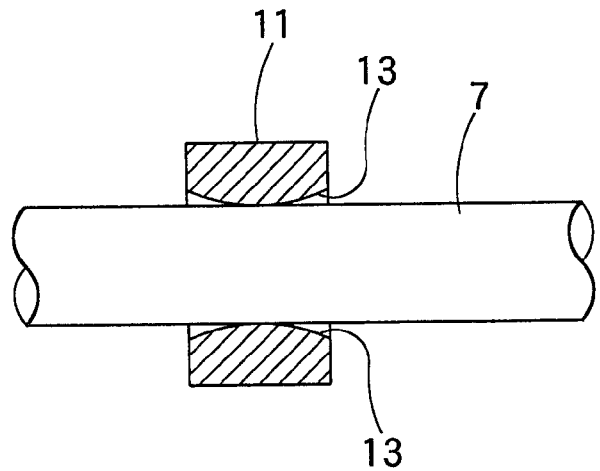
FIG. 6 is an enlarged cross sectional view of a slide bearing and a valve shaft.
Figure 7:
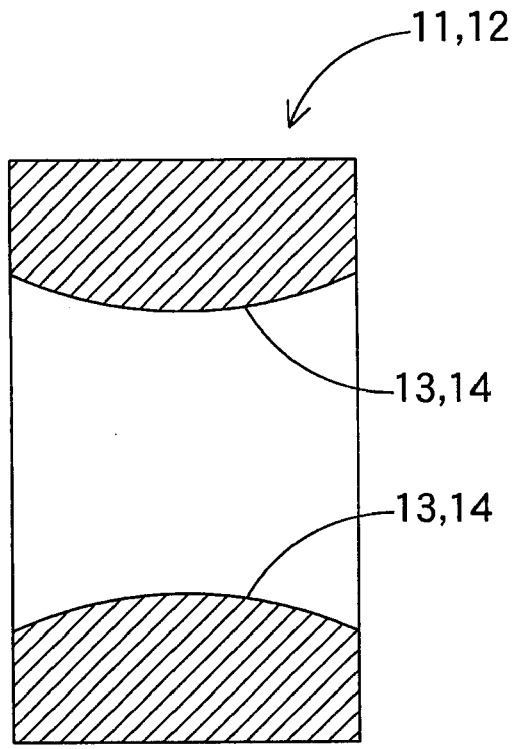
FIG. 7 is a plan view of an expansion state of a seal member 10.
Figure 8:
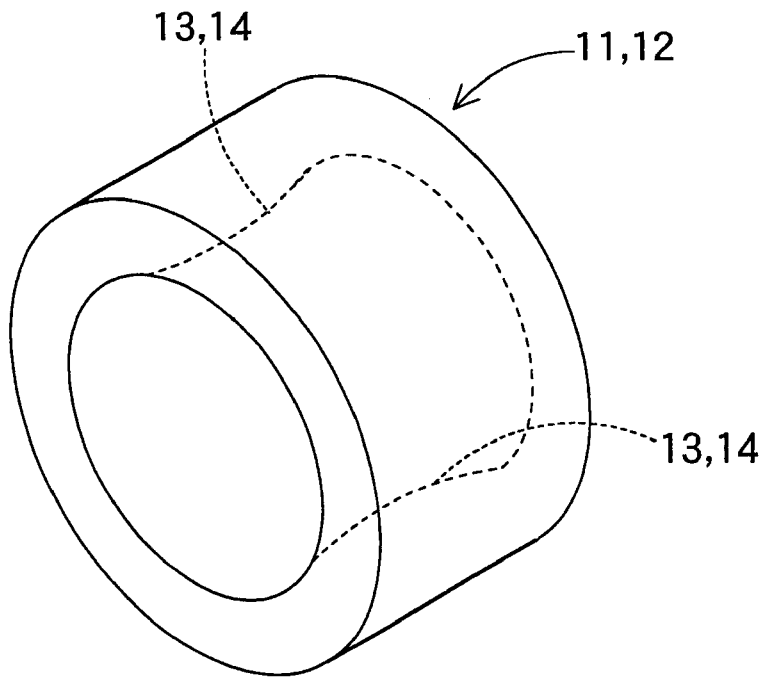
FIG. 8 is a perspective view of the slide bearing.

Both end portions of the valve shaft 7 are rotatably fitted to the slide bearings 11 and 12 in both sides, and both of the slide bearings 11 and 12 are formed so that inner peripheral surfaces contacting with the valve shaft 7 have convex curved surfaces 13 and 14 protruding to an inner peripheral side. As shown in cross sectional views in FIGS. 6 and 7, the convex curved surfaces 13 and 14 in the inner peripheral side of the slide bearings 11 and 12 are formed in a circular arc shape in which an inner peripheral surface shape protrudes to an inner side near a center portion in a cross section along an axial direction. In this case, the circular arc shape is a concept including a part of a complete round circular arc or a part of an oval circular arc. Then, the valve body 8 having the same shape as that of the valve hole 9 and being capable of opening and closing the butterfly-shaped valve hole 9 is fixed on the valve shaft 7 by a fixing screw 15. It is possible to fit a seal member such as a rubber or the like to a peripheral edge portion of the valve body 8.

Figure 4:
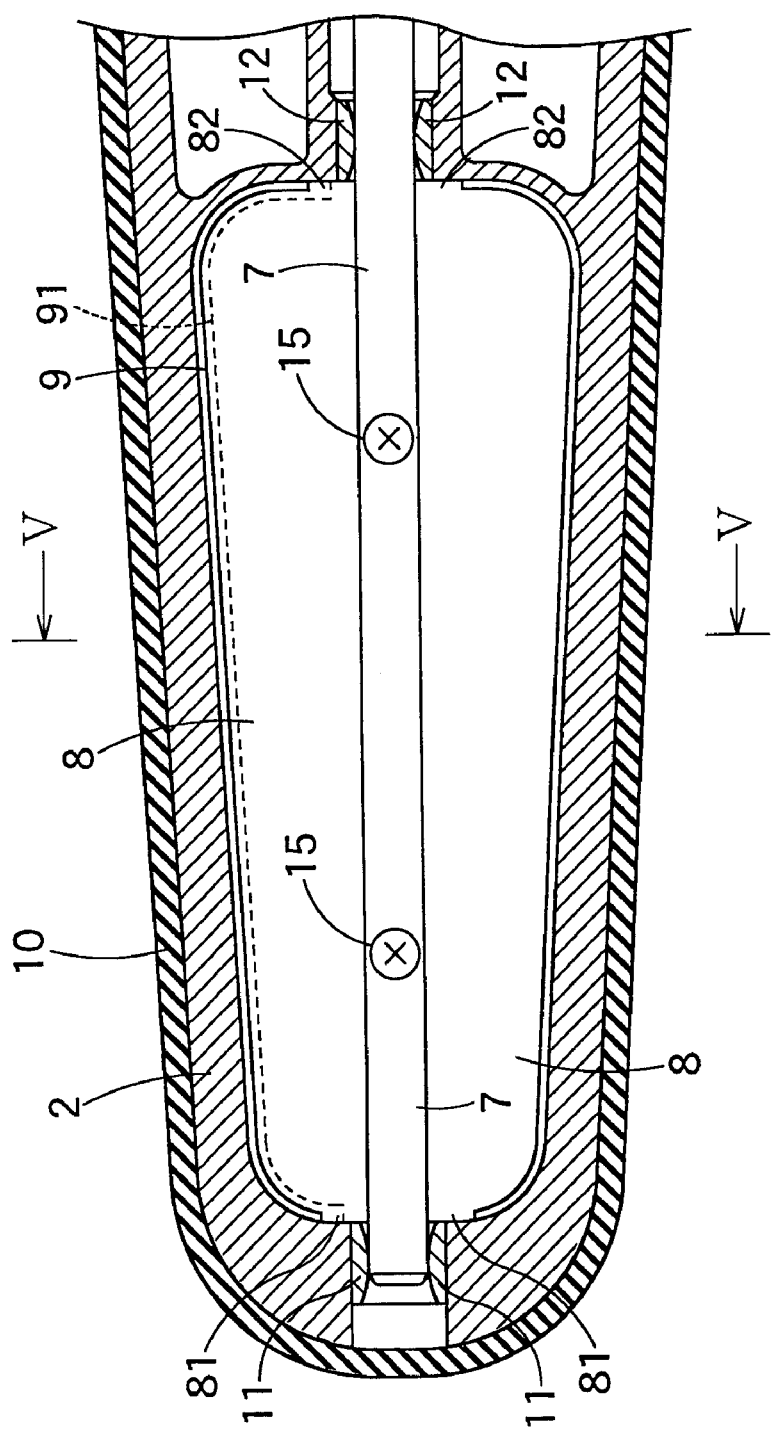
FIG. 4 is a cross sectional view along a line IV—IV in FIG. 3.
Figure 5:
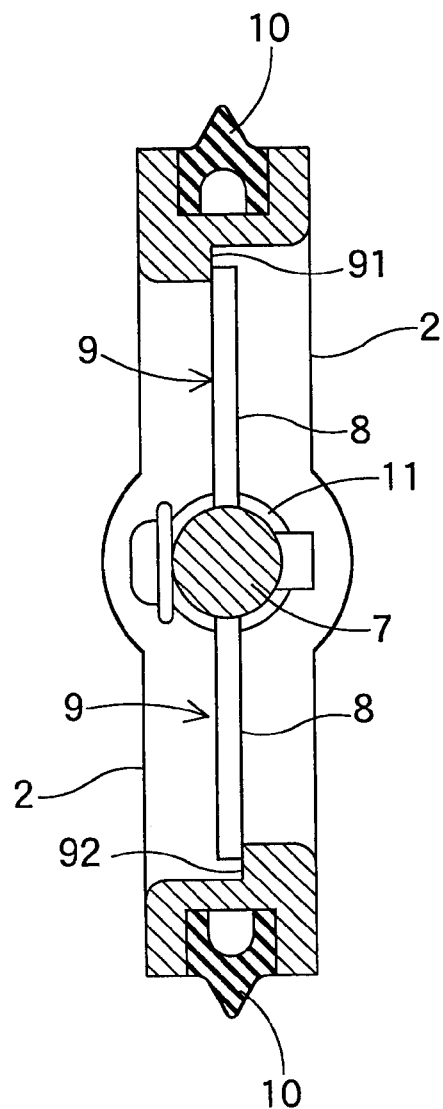
FIG. 5 is an enlarged cross sectional view along a line V—V in FIG. 4.

On the contrary, contact portions 91 and 92 with which the edge portion of the valve body 8 is brought into contact at a time of closing are formed in a peripheral edge portion of the valve hole 9 which is opened and closed in accordance with the rotation of the valve body 8, with a step. As shown in FIG. 5, when the valve body 8 is closed, the peripheral edge portion of the valve body 8 is brought into contact with the contact portions 91 and 92 so as to close the valve hole 9. Further, as shown in FIG. 4, gap filling protrusion portions 81 and 82 are formed in both sides of the valve body 8 near the valve shaft, that is, both end portions of the valve body positioned near the slide bearings 11 and 12 in such a manner as to slightly protrude out. A movement of the valve body 8 in an axial direction is limited by the gap filling protrusion portions 81 and 82, thereby minimizing a gap which is easily generated with respect to the valve hole 9 at a time of being fully closed, and minimizing an air leak at a time of being fully closed. Further, at a time of closing, it is possible to minimize the air leak at a time of being fully closed by the peripheral edge portion of the valve body 8 being brought into contact with the contact portions 91 and 92 of the valve hole 9.

The butterfly-shaped valve body 8 of the intake control valve 1 having the structure mentioned above is assembled in the valve holder 2 at a time of being manufactured, by first press-fitting the slide bearings 11 and 12 to the columnar hole of the valve holder 2, fitting the valve shaft 7 into the slide bearings 11 and 12, thereafter arranging the valve body 8 within the valve hole 9, and fastening and fixing the, valve body 8 on the valve shaft 7 by using the fixing screw 15. At this time, even if some displacement exists in the axial position of the slide bearings 11 and 12 in both sides, it is possible to fit the valve shaft 7 into the slide bearings 11 and 12 in a comparatively easy manner because the convex curved surfaces 13 and 14 protruding to the inner side near the center are formed in the inner peripheral side of the slide bearings 11 and 12.

Then, since the slide bearings 11 and 12 in both sides to which the valve shaft 7 is fitted are in line contact with the outer peripheral surface of the valve shaft 7 on the inner peripheral surface thereof, the gap therebetween becomes minimum, and it is possible to minimize the fluid leak at a time of being closed. Further, since the inner peripheral surfaces of the slide bearings 11 and 12 are in contact with the outer peripheral surface of the valve shaft 7 in a substantially line contact manner, it is possible to well absorb an incline or a displacement generated between the bearings 11 and 12 in both sides due to a vibration, a heat deformation or the like at a time of being used.

Figure 9:
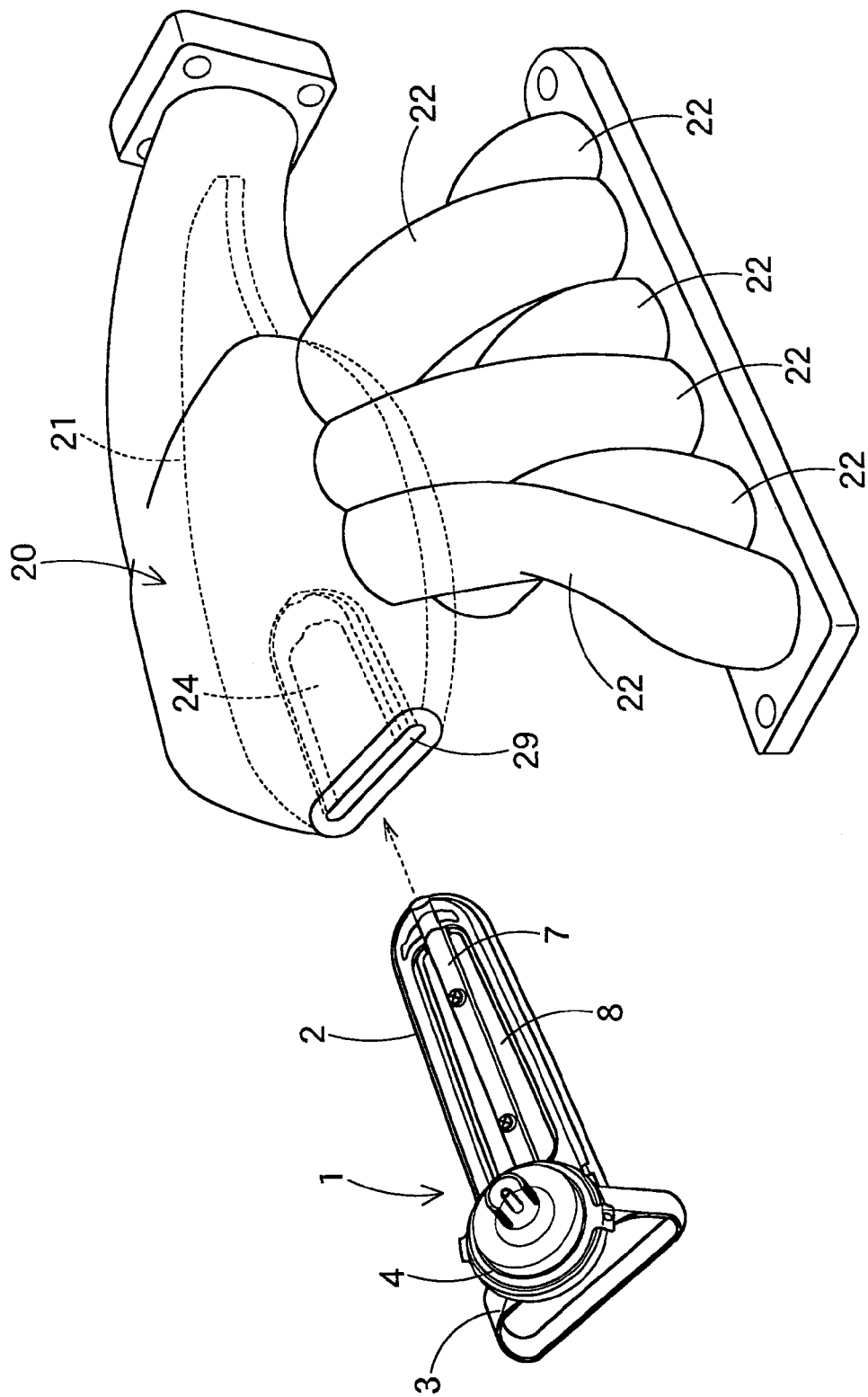
FIG. 9 is a schematic perspective view of an intake control valve and a surge tank.
Figure 10:
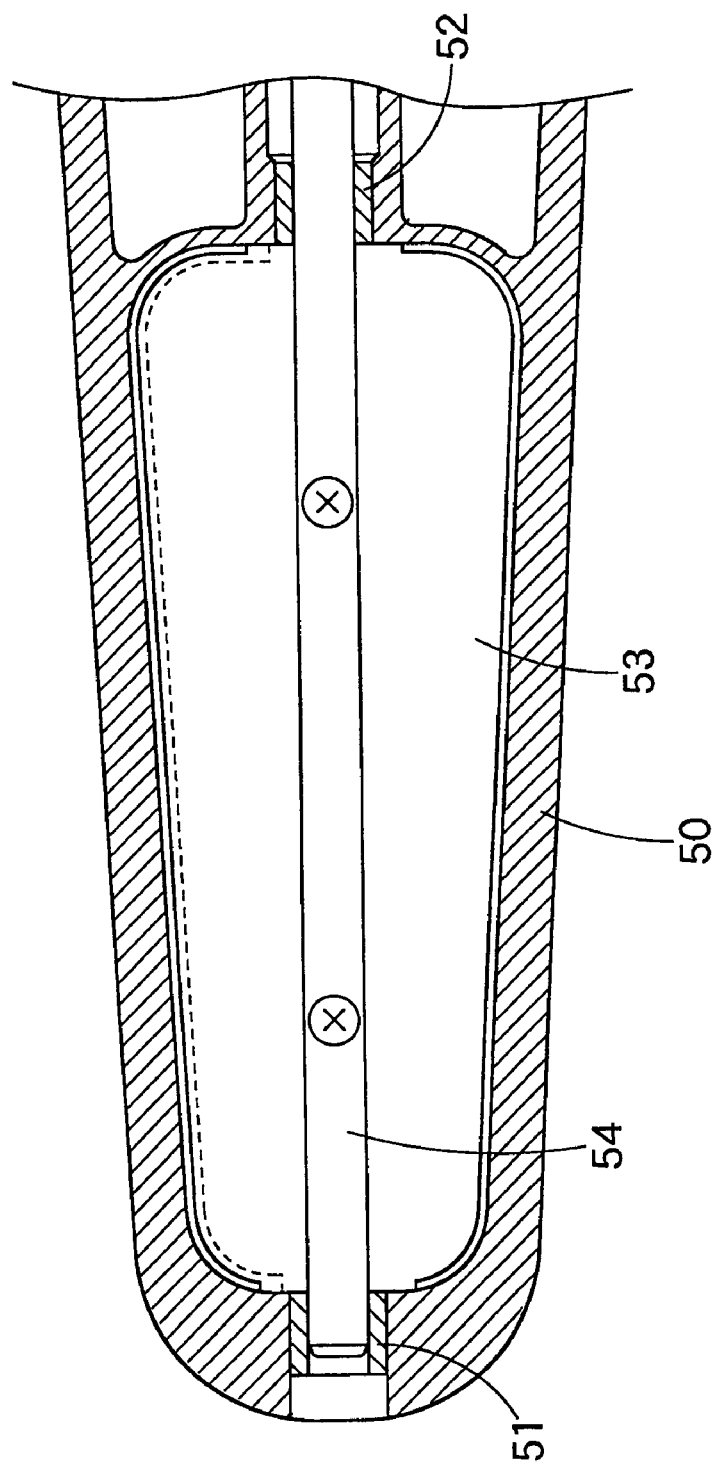
FIG. 10 is a cross sectional view of a conventional butterfly valve.

The valve holder 2 is formed in the same shape as a communication hole 24 (an opening portion having a substantially trapezoidal shape) connected to the opening portion 29 in such a manner as to be inserted into the surge tank 20 from the opening portion 29 and be fitted to the communication hole 24 in an airtight manner, as shown in FIG. 9. A groove for a seal member is continuously formed in the peripheral edge portion of the valve holder 2 in a longitudinal direction, and the seal member 10 is fitted into the groove. Then, the intake control valve 1 in which the seal member 10 is attached to the peripheral edge portion of the valve holder 2 is inserted into the surge tank 20 from the opening portion 29, as shown in FIG. 9, and is fitted to the communication hole 24 (the substantially trapezoidal opening portion) connected to the opening portion 29 in an airtight manner.

As mentioned above, the intake control valve 1 attached to the surge tank 20 is structured such that the diaphragm type actuator 4 is connected to an intake branch pipe 22 via the control valve and the control valve is connected to an engine control circuit. Accordingly, the intake control valve 1 is controlled so as to be opened and closed in correspondence to an operation condition of the internal combustion engine.

For example, during the internal combustion engine being operated at a high load and a low speed, the intake control valve 1 is controlled in such a manner as to close the valve body 8 on the basis of the driving of the actuator 4, whereby within the surge tank 20, a node of a columnar vibration generated by an intake pulsation forms a branch portion, a vibration frequency generated by the intake pulsation becomes comparatively low, an intake charging efficiency is increased on the basis of an intake inertia effect in the case of a low engine speed, and a shaft torque of the engine is improved.

On the contrary, during the internal combustion engine being operated at a low load and a high speed, the intake control valve 1 is controlled in such a manner as to open the valve body 8, whereby within the surge tank 20, the node of the columnar vibration generated by the intake pulsation forms an opening end of the intake branch pipe 22, the vibration frequency generated by the intake pulsation becomes comparatively high, the intake charging efficiency is increased on the basis of the intake inertia effect in the case of a high engine speed, and the shaft torque of the engine is improved.

As mentioned above, since the inner peripheral surfaces of the slide bearings 11 and 12 rotate in contact with the outer peripheral surface of the valve shaft 7 in a substantially line contact manner, when the valve body 8 rotates via the valve shaft 7 at a time of the opening and closing control of the intake control valve 1, both of the slide bearings 11 and 12 perform a self-aligning operation so as to well absorb the incline or the displacement generated between the slide bearings 11 and 12 in both sides due to the vibration or the heat deformation at a time of being used, whereby it is possible to secure a good opening and closing operation of the valve. Further, since the inner peripheral surfaces of the slide bearings 11 and 12 are in contact with the outer peripheral surface of the valve shaft 7 in a substantially line contact manner, the gap therebetween becomes minimum, and it is possible to minimize the air leak at a time of being closed.

In this case, in the embodiment mentioned above, the description will be given of the embodiment in which the butterfly valve in accordance with the present invention is applied to the intake control valve, however, the butterfly valve in accordance with the present invention can be applied to the control valve for controlling so as to open and close the other fluids.

What is claimed is:

1. A butterfly valve comprising:
   (a) a pair of slide bearings arranged on the same axis in both sides with respect to a valve hole;
   (b) a valve shaft rotatably supported to the slide bearings; and
   (c) a butterfly-shaped valve body fixed to said valve shaft and opening and closing the valve hole in correspondence to a rotation of the valve shaft,
      wherein an inner peripheral surface which is in contact with the valve shaft in the slide bearings in both sides is formed by a convex curved surface protruding to an inner peripheral side, and an inner peripheral surface shape of the slide bearing in a cross section along an axial direction is formed in a circular arc shape.

2. A butterfly valve as claimed in claim 1, wherein said butterfly valve is formed as an intake control valve which is attached to a surge tank of an internal combustion engine, said intake control valve has a valve holder which is provided with a valve hole in an inner side, and said pair of slide bearings are mounted to both sides of said valve holder on the same axis.

3. A butterfly valve as claimed in claim 2, wherein gap filling protrusion portions are formed in both end portions of the valve body positioned near the slide bearings in such a manner as to slightly protrude to sides of said slide bearings.

4. A butterfly valve as claimed in claim 2, wherein a contact portion with which an edge portion of the valve body is brought into contact at a time of being closed is formed in a step shape in a peripheral edge portion of the valve hole of said valve holder opened and closed in accordance with a rotation of the valve body.

* * * * *